United States Patent
Gentsch

(10) Patent No.: US 9,336,960 B2
(45) Date of Patent: May 10, 2016

(54) METHOD OF MANUFACTURING A PUSH ROD OF A VACUUM INTERRUPTER

(71) Applicant: ABB Technology AG, Zurich (CH)

(72) Inventor: Dietmar Gentsch, Ratingen (DE)

(73) Assignee: ABB TECHNOLOGY AB, Zürich (CH)

( * ) Notice: Subject to any disclaimer, the term of this patent is extended or adjusted under 35 U.S.C. 154(b) by 150 days.

(21) Appl. No.: 13/908,392

(22) Filed: Jun. 3, 2013

(65) Prior Publication Data

US 2013/0264312 A1    Oct. 10, 2013

Related U.S. Application Data

(63) Continuation of application No. PCT/EP2011/006038, filed on Dec. 2, 2011.

(30) Foreign Application Priority Data

Dec. 3, 2010   (EP) .................... 10015327

(51) Int. Cl.
| | |
|---|---|
| *H01H 3/46* | (2006.01) |
| *B29C 45/16* | (2006.01) |
| *H01H 33/666* | (2006.01) |
| *B29C 67/00* | (2006.01) |
| *B29K 77/00* | (2006.01) |
| *B29K 105/12* | (2006.01) |

(52) U.S. Cl.
CPC ................ *H01H 3/46* (2013.01); *B29C 45/16* (2013.01); *B29C 67/00* (2013.01); *H01H 33/666* (2013.01); *B29K 2077/00* (2013.01); *B29K 2105/12* (2013.01); *B29K 2995/0006* (2013.01)

(58) Field of Classification Search
CPC ........ H01H 3/46; H01H 33/66; H01H 33/666
USPC .......... 218/140, 154, 118; 200/262, 538, 540, 200/400; 361/779, 120, 326; 264/250
See application file for complete search history.

(56) References Cited

U.S. PATENT DOCUMENTS

| | | | |
|---|---|---|---|
| 4,421,961 A | 12/1983 | Sakuma et al. | |
| 5,069,077 A | 12/1991 | Rudolph et al. | |

(Continued)

FOREIGN PATENT DOCUMENTS

| | | |
|---|---|---|
| DE | 3015334 A1 | 10/1981 |
| DE | 9319264 U1 | 2/1994 |

(Continued)

OTHER PUBLICATIONS

Machine translation of ABB Patent DE9319264 (orig. doc. published Mar. 2, 1994).*

(Continued)

*Primary Examiner* — Renee S Luebke
*Assistant Examiner* — William Bolton
(74) *Attorney, Agent, or Firm* — Buchanan Ingersoll & Rooney PC

(57) ABSTRACT

A method is disclosed of manufacturing a push rod for switching a vacuum interrupter by moulding the push rod with a plastic material. The push rod can include a core component configured for receiving a spring element. The push rod can also include a rod component which may include another second material, wherein a core component is embedded in the rod component to form the push rod.

13 Claims, 2 Drawing Sheets

(56) References Cited

U.S. PATENT DOCUMENTS

| | | | |
|---|---|---|---|
| 6,044,963 A | 4/2000 | Lerch et al. | |
| 6,130,594 A | 10/2000 | Morant et al. | |
| 8,261,639 B2* | 9/2012 | Liao | 81/177.1 |
| 2007/0034043 A1 | 2/2007 | Feltrin | |
| 2009/0039989 A1 | 2/2009 | Reuber | |
| 2010/0078302 A1 | 4/2010 | Erk et al. | |
| 2010/0108643 A1 | 5/2010 | Gentsch | |
| 2010/0170774 A1 | 7/2010 | Einschenk et al. | |
| 2010/0307893 A1 | 12/2010 | Peter et al. | |
| 2011/0036812 A1* | 2/2011 | Nagatake et al. | 218/140 |

FOREIGN PATENT DOCUMENTS

| | | |
|---|---|---|
| DE | 10238950 A1 | 3/2004 |
| DE | 102006040252 A1 | 3/2008 |
| EP | 0818294 A1 | 1/1998 |
| EP | 0898780 B1 | 4/2000 |
| EP | 1367616 A1 | 12/2003 |
| EP | 1749736 A1 | 2/2007 |
| EP | 1843375 A1 | 10/2007 |
| EP | 2312606 A1 | 4/2011 |
| JP | 56-167222 A | 12/1981 |
| JP | 2003-031091 A | 1/2003 |
| WO | WO 2008/151937 A1 | 12/2008 |
| WO | WO 2009/034092 A1 | 3/2009 |

OTHER PUBLICATIONS

International Search Report (PCT/ISA/210) issued on Jan. 24, 2012, by the European Patent Office as the International Searching Authority for International Application No. PCT/EP2011/006038.

Written Opinion (PCT/ISA/237) issued on Jan. 24, 2012, by the European Patent Office as the International Searching Authority for International Application No. PCT/EP2011/006038.

European Search Report issued Jun. 1, 2011 for European Application No. 10015327.9.

International Search Report (PCT/ISA/210) issued on Nov. 12, 2010, by European Patent Office as the International Searching Authority for International Application No. PCT/EP2010/006288.

Written Opinion (PCT/ISA/237) issued on Nov. 12, 2010, by European Patent Office as the International Searching Authority for International Application No. PCT/EP2010/006288.

* cited by examiner

US 9,336,960 B2

METHOD OF MANUFACTURING A PUSH ROD OF A VACUUM INTERRUPTER

RELATED APPLICATION

This application claims priority as a continuation application under 35 U.S.C. §120 to PCT/EP2011/006038, which was filed as an International Application on Dec. 2, 2011 designating the U.S., and which claims priority to European Application 10015327.9 filed in Europe on Dec. 3, 2010. The entire contents of these applications are hereby incorporated by reference in their entireties.

FIELD

The present disclosure relates to a method of manufacturing a push rod for switching a vacuum interrupter, a push rod for switching a vacuum interrupter, and a vacuum interrupter including such a push rod.

BACKGROUND

To open and close vacuum interrupter contacts, a push rod can be used to hold the contacts in closed position and to exert a force on the contacts. The system can be manufactured by producing a metal part, for example made of a steel or a brass material by machining, and later by embedding the metal part by injection moulding in order to produce a push rod part and, respectively, the push rod. Within the metal hole a spring or a spring washer is installed. The push rod can be installed inside a pull housing of the vacuum interrupter by using an intricate tool to apply a torque using a wrench direct to the metal part (wrench face of the metal part; spring retainer until 4 mm or more) which transfers the torque to the threaded connection between the steel stud of the vacuum interrupter and the metal part of the push rod.

U.S. 2010/0108643 A1 discloses a switching device with a vacuum interrupter chamber in which at least one moving contact piece is arranged. To considerably increase the switching rating and the dielectric strength, it is proposed that two series-connected contact arrangements with a total of two contact levels which can be opened are arranged within the vacuum interrupter chamber.

U.S. Pat. No. 5,069,077 discloses an actuating mechanism for a vacuum type interrupter with a contact spring. The actuating mechanism has a pivotally positioned two-armed lever and a spring which holds the contact force ready and which engages with the lever. The two-armed lever is guided with limited displacement in a bearing in a direction which runs approximately parallel to the actuating direction of the interrupter. The two-armed lever pivots about a bearing bolt around the end of the bolt guiding until the contact elements engage each other.

SUMMARY

A method of manufacturing a push rod is disclosed for switching a vacuum interrupter, wherein the method comprises: moulding a core component of the push rod with a first plastic material, wherein the core component is adapted for receiving a spring element; and embedding the first plastic material of the core component with a second plastic material to form a rod component of the push rod embedding the core component.

A push rod for switching a vacuum interrupter is also disclosed, wherein the push rod comprises: a core component formed of a first plastic material; and a rod component formed of a second plastic material, wherein the core component is embedded in the rod component to form the push rod

BRIEF DESCRIPTION OF THE DRAWINGS

The foregoing and other related aspects of the invention will become apparent from and elucidated with reference to the exemplary embodiments described hereinafter.

Exemplary preferred embodiments will be described in more detail with reference to the attached schedmatic drawings, wherein.

DETAILED DESCRIPTION

Figure 1:
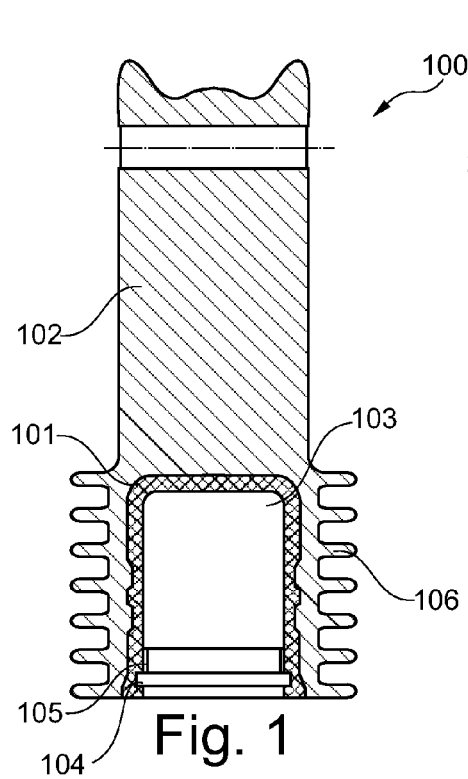
FIG. 1 shows a cross-sectional view of an exemplary push rod.

An improved, simple and efficient method of manufacturing a push rod for switching a vacuum interrupter is disclosed which can reduce complexity and enhance efficiency. A push rod is also disclosed with, for example, an improved dielectric strength.

An exemplary method of manufacturing a push rod for switching a vacuum interrupter can comprise moulding a push rod having a core component configured (i.e., adapted) for receiving a spring element with a plastic material, such as a polyamide, for example, PA6.6 GF33. The core component of the push rod as well as a rod component of the push rod can be both manufactured with plastic material, thereby enabling a greater dielectric strength and omitting to manufacture the core component by a metal part such as steel or brass material by machining.

Such a push rod of plastic material may, for example, be lighter than a push rod with brass material and may include (e.g., consist of) one type of plastic material, which may reduce the manufacturing costs of the push rod.

For example, the moulding of the push rod with a plastic material can include moulding the core component of the push rod with a first material and embedding the first plastic material of the core component with a second plastic material thereby forming a rod component of the push rod embedding the core component. The first and second plastic materials may be different materials or may be one plastic material according to exemplary embodiments.

In an exemplary embodiment, the first plastic material is a polyamide, such as PA6.6 GF33, and the second plastic material is a different plastic material such as another polyamide, for example.

According to another exemplary embodiment, the moulding of the core component and embedding the core component, thereby forming a rod component of the push rod, takes place in one double cycle process (e.g., 2k-process) resulting in a more efficient manufacturing of the push rod.

According to a further exemplary embodiment, a push rod for switching a vacuum interrupter with a core component can include a first plastic material, such as a polyamide, for example PA6.6 GF33, and a rod component containing a second plastic material, which may be the same plastic material as the first plastic material or a different plastic material, wherein the core component is embedded in the rod component thereby forming the push rod.

Such a push rod may provide for a higher dielectric strength and may have a lighter weight compared to push rods with a metal part.

According to an exemplary embodiment, the push rod can include a plunger for threadedly engaging the core component of the push rod and a torque twisting protection system configured (i.e., adapted) for transferring a torque applied at the rod component, for example at an end of the push rod or at the eye or bus of the push rod, to the plunger and to the threaded engagement region of the core component for installing and/or positioning the push rod inside a pull component of a vacuum interrupter. Thus it may be possible to transfer the torque directly from the opposite side of the push rod to the bolt and to the threaded area. The core component of the push rod, which may be made of plastic and according to another exemplary embodiment of steel is substantially (i.e., generally) movable by applying some torque, wherein the twist protection system can block one turning direction for example through a freewheel (roller) clutch. The arrangement to orientate the push rod can be done in the opposite direction.

In an exemplary embodiment, the torque twisting protection system of the push rod is arranged at a region between the core component and the plunger of the push rod thereby enabling the torque to be applied directly at the push rod and reducing manufacturing costs.

According to an exemplary embodiment, the push rod can include an anchor nut or a screwed insert arranged at the core component of the push rod between the plunger and the core component of the push rod, the torque twisting protection system being arranged at the region between the anchor nut and the plunger of the push rod.

In order to enable the application of the torque directly to an end or an eye of the push rod, the torque twisting protection system is configured (i.e., adapted) for blocking one turning direction of the core component of the push rod opposite of the direction of the torque.

Depending on the specific application or manufacturing possibilities the torque twisting protection system can include a torque twisting protection device selected from the group consisting of a freewheel (roller) clutch, a spur gearing, a circumferential toothing, a safety clutch, and a friction clutch for blocking one turning direction of the core component of the push rod, or any other suitable device. The free wheeling can be provided by one or more rolls in an angular plane, or by a sphere, wherein the material of the roll or the sphere may be metal or plastic.

Thus, according to the above-mentioned exemplar embodiments, the use of an intricate tool such as a wrench to apply the torque may be omitted and the face for applying the tool at the stem of the push rod may be omitted. The push rod may be aligned in a position (eye position) to connect the vacuum interrupter after the installation or if the torque is attained, freely movable compared to the torque direction in case of using the freewheel clutch and the toothing. Furthermore a torque in both directions may be possible. The whole pole part construction can be more variable in the area of the push rod as the room for the intricate tool to apply the torque may be omitted.

An exemplary push rod 100 for switching a vacuum interrupter as shown in FIG. 1 is principally embedding a core component 101, wherein at the region of embedment the embedding rod component 102 of the push rod 100 comprises a plurality of ribs 106. The core component 101 comprises a first plastic material, such as polyamide PA6.6 GF33, wherein the rod component 102 comprises a second plastic material and forms a spring (compartment) retainer 103, comprising a circumferential groove 104 and a thread 105 for engaging a plunger 200 (see FIG. 2) of the push rod 100.

Figure 2:
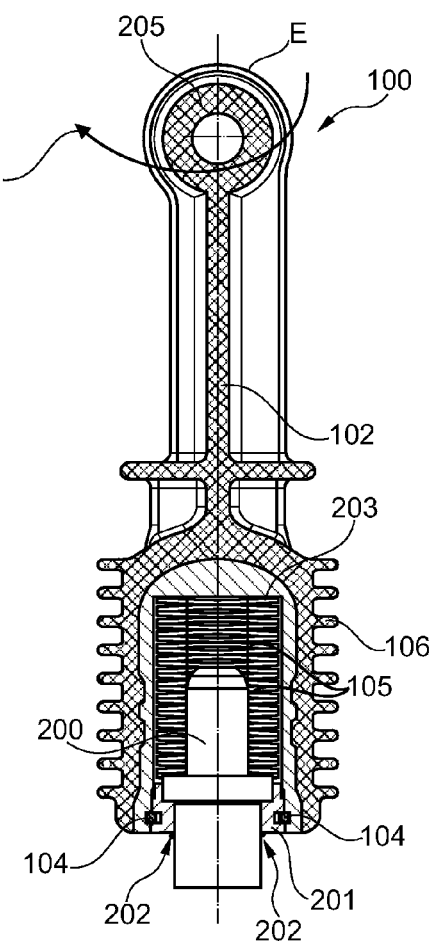
FIG. 2 shows a cross-sectional view of an exemplary push rod with a plunger and a torque twisting protection system.

The push rod 100 with a plunger 200 and the spring element 203 of FIG. 2 comprises a rod component 102 and a core component 101 as shown in FIG. 1, wherein between the plunger 200 and the spring retainer 103 a metal ring nut or an anchor nut 201 or a screwed insert 201 is arranged, engaging with the groove 104. The spring element 203 of spring 203 may be tensioned between the plunger 200 and the push rod 100 by applying a torque 204 at an end region E of the push rod or at an eye 205 of the push rod 100. A torque twisting protection system 202 is arranged at a region between the core component 101 and the plunger 200 of the push rod 100, for example, between the anchor nut 201 or screwed insert 201 and the plunger 200. The torque twisting protection system 202 is configured (i.e., adapted) for transferring the torque 204 applied at the rod component 102 of the push rod 100 to the plunger 200 and to the threaded engagement region 105 of the core component 101 for installing and/or positioning the push rod 100 inside a pole component of a vacuum interrupter, wherein at the same time the spring element 203 is tensioned. The torque twisting protection system 202 enables positioning of the eye 205 in a defined position.

Figure 3:
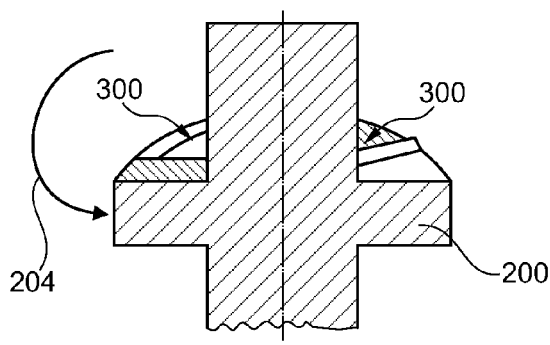
FIG. 3 shows a perspective view of part of an exemplary push rod with with a torque twisting protection system.

The part of the plunger 200 of FIG. 3 is shown with a circumferential toothing 300 being applied at the plunger 200, such that a torque 204 may be applied at an end of a rod component (see FIG. 2) for transferring the torque 204 directly from the push rod to the plunger, wherein the torque twisting protection system is configured (i.e., adapted) for blocking one turning direction of the core component 101 of the push rod 100 opposite to the direction of the torque 204. It is also possible to use a spur gearing, an angular spur gearing, and a toothing at the circumference of the plunger 200 or frontal to the plunger 200, or other suitable device.

Figure 4:
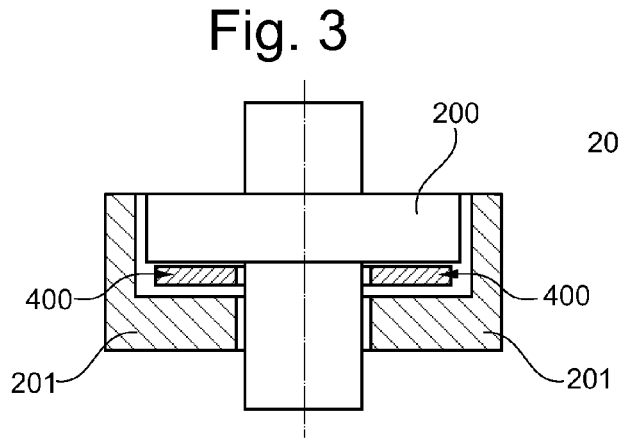
FIG. 4 shows a cross-sectional view of part of an exemplary push rod with a torque twisting protection system.

In FIG. 4 a cross-sectional view of the exemplary pushrod with the plunger 200 of FIG. 2 is shown, wherein a safety clutch 400 or a friction clutch 400 is arranged between the plunger 200 and the anchor nut 201 arranged at the core component (not shown) of the push rod. The safety or friction clutch 400 may be adapted to the torque.

Figure 5:
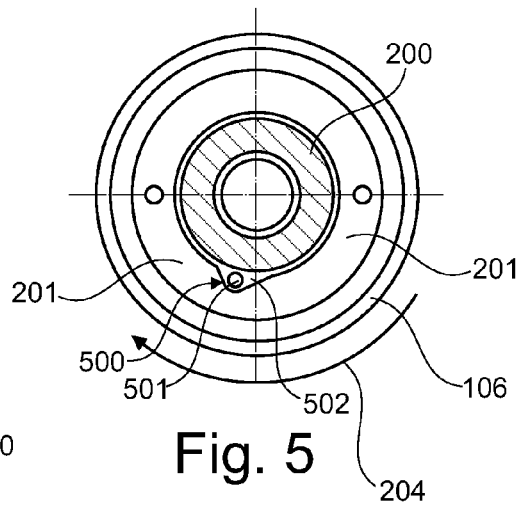
FIG. 5 shows a cross-sectional view of part of an exemplary push rod with a torque twisting protection system with a freewheel clutch.

In FIG. 5 a torque twisting protection system 500 is shown with a roll 501 or sphere and a clamping angle 502 forming the freewheel clutch 500, wherein the freewheel clutch 500 is arranged between the plunger 200 and the anchor nut 201.

Figure 6:
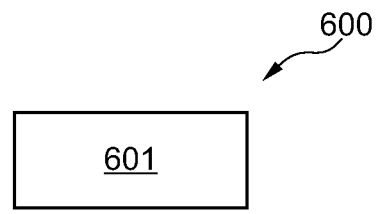
FIG. 6 shows an exemplary method of manufacturing a push rod for switching a vacuum interrupter.

According to FIG. 6, an exemplary method 600 of manufacturing a push rod for switching a vacuum interrupter is shown with the step of moulding 601 the push rod with a plastic material, wherein the push rod comprises a core component adapted for receiving a spring element.

Figure 7:
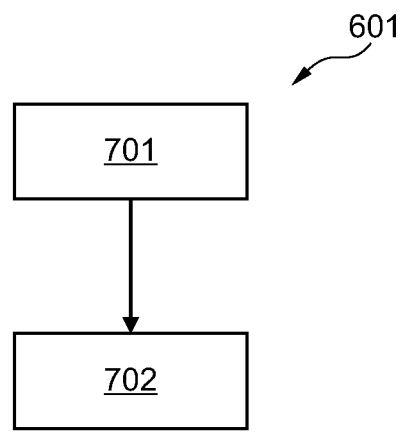
FIG. 7 shows an exemplary method of manufacturing a push rod for switching a vacuum interrupter.

FIG. 7 depicts another exemplary embodiment in a flow-chart diagram showing the method according to FIG. 6 with the moulding step 601 comprising the moulding 701 of a core component of the push rod with a first plastic material, such as a polyamide, such as a PA6.6 GF33, and embedding 702 the first plastic material of the core component with a second plastic material thereby forming a rod component of the push rod embedding the core component.

While the invention has been illustrated and described in detail in the drawings and the foregoing description, such illustration and description are to be considered illustrative or exemplary and not restrictive; the invention is not limited to the disclosed embodiments. Other variations to the disclosed embodiments can be understood and effected by those skilled in the art and practicing the claimed invention, from study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference symbols in the claims should not be construed as limiting the scope.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

REFERENCE SIGNS

100 Push rod
101 Core component
102 Rod component
103 Spring retainer
104 Groove
105 Thread
106 Rib
200 Plunger
201 Anchor nut
202 Torque twisting protection system
300 Spur gearing
400 Safety clutch, friction clutch
500 Freewheel clutch
501 Roll
502 Clamping angle
600 Method of manufacturing a push rod
601 Moulding the push rod with a plastic material
701 Moulding the core component of a push rod with a first plastic material
702 Embedding the first plastic material of the core component with a second plastic material thereby forming a rod component of the push rod embedding the core component

The invention claimed is:

1. Push rod for switching a vacuum interrupter, wherein the push rod comprises:
a core component formed of a first plastic material;
a rod component formed of a second plastic material, wherein the core component is embedded in the rod component to form the push rod;
a plunger for threadedly engaging the core component of the push rod; and
a torque twisting protection system,
wherein the torque twisting protection system is configured for transferring a torque applied at the rod component of the push rod to the plunger and to a threaded engagement region of the core component for installing and/or positioning the push rod inside a pole component of a vacuum interrupter, and
wherein the torque twisting protection system is configured for blocking one turning direction of the core component of the push rod opposite to a direction of the torque.

2. The push rod according to claim 1, wherein the torque twisting protection system is arranged at a region between the core component and the plunger of the push rod.

3. The push rod according to claim 1, wherein the push rod comprises:
an anchor nut arranged at the core component of the push rod between the plunger and the core component of the push rod, wherein the torque twisting protection system is arranged at a region between the anchor nut and the plunger of the push rod.

4. The push rod according to claim 1, wherein the torque twisting protection system comprises:
a torque twisting protection device selected from the group consisting of: a freewheel clutch, a spur gearing, a circumferential toothing, a safety clutch, and a friction clutch.

5. The push rod according to claim 1, wherein the first plastic material and the second plastic material are the same plastic materials.

6. The push rod according to claim 1, wherein the first plastic material is polyamide PA6.6 GF33 and the second plastic material is a different plastic material.

7. A vacuum interrupter comprising:
vacuum interrupter contacts; and
a push rod according to claim 1 for actuating the vacuum interrupter contacts.

8. Push rod for switching a vacuum interrupter, wherein the push rod comprises:
a core component formed of a first plastic material;
a rod component formed of a second plastic material, wherein the core component is embedded in the rod component to form the push rod;
a plunger for threadedly engaging the core component of the push rod; and
a torque twisting protection system,
wherein the torque twisting protection system is configured for transferring a torque applied at the rod component of the push rod to the plunger and to a threaded engagement region of the core component for installing and/or positioning the push rod inside a pole component of a vacuum interrupter,
wherein the torque twisting protection system is arranged at a region between the core component and the plunger of the push rod, and
wherein the torque twisting protection system is configured for blocking one turning direction of the core component of the push rod opposite to the direction of the torque.

9. The push rod according to claim 8, wherein the push rod comprises:
an anchor nut arranged at the core component of the push rod between the plunger and the core component of the push rod, wherein the torque twisting protection system is arranged at a region between the anchor nut and the plunger of the push rod.

10. The push rod according to claim 8, wherein the torque twisting protection system comprises:
a torque twisting protection device selected from the group consisting of: a freewheel clutch, a spur gearing, a circumferential toothing, a safety clutch, and a friction clutch.

11. The push rod according to claim 8, wherein the first plastic material and the second plastic material are the same plastic materials.

12. The push rod according to claim 8, wherein the first plastic material is polyamide PA6.6 GF33 and the second plastic material is a different plastic material.

13. A vacuum interrupter comprising:
vacuum interrupter contacts; and
a push rod according to claim 8 for actuating the vacuum interrupter contacts.

\* \* \* \* \*